(12) United States Patent
Baer et al.

(10) Patent No.: US 7,677,864 B2
(45) Date of Patent: Mar. 16, 2010

(54) BULK MATERIAL PUMP FEEDER WITH REDUCED DISK JAMMING, COMPLIANT DISKS

(75) Inventors: Timothy R. Baer, Gibbsboro, NJ (US);
James T. Foley, Mickleton, NJ (US);
Glenn Meredith, Sicklerville, NJ (US)

(73) Assignee: K-Tron Technologies, Inc., Pitman, NJ (US)

( * ) Notice: Subject to any disclaimer, the term of this patent is extended or adjusted under 35 U.S.C. 154(b) by 580 days.

(21) Appl. No.: 11/546,077

(22) Filed: Oct. 11, 2006

(65) Prior Publication Data

US 2007/0084700 A1  Apr. 19, 2007

Related U.S. Application Data

(60) Provisional application No. 60/726,340, filed on Oct. 12, 2005.

(51) Int. Cl.
*F01D 1/36* (2006.01)
(52) U.S. Cl. .......................... 415/90; 415/126; 415/140
(58) Field of Classification Search .................. 415/90, 415/126, 140
See application file for complete search history.

(56) References Cited

U.S. PATENT DOCUMENTS

| | | | |
|---|---|---|---|
| 1,061,142 A | 5/1913 | Tesla |
| 2,632,399 A | 3/1953 | Hyre |
| 2,868,351 A | 1/1959 | Hegmann |
| 2,919,054 A | 12/1959 | Waller |
| 3,245,613 A | 4/1966 | Jonakin |
| 3,787,093 A | 1/1974 | Hanselmann et al. |
| 3,920,116 A | 11/1975 | Butler |
| 4,516,674 A | 5/1985 | Firth |
| 4,597,491 A | 7/1986 | Conklin |
| 4,826,401 A | 5/1989 | Clark et al. |
| 4,988,239 A | 1/1991 | Firth |
| 5,029,875 A | 7/1991 | Spain et al. |
| 5,051,041 A | 9/1991 | Firth |
| 5,186,604 A | 2/1993 | Iorio et al. |
| 5,190,140 A | 3/1993 | Buschbom |
| 5,355,993 A | 10/1994 | Hay |
| 5,356,280 A | 10/1994 | Ponzielli |

(Continued)

FOREIGN PATENT DOCUMENTS

EP  0 467 842 A  1/1992

(Continued)

OTHER PUBLICATIONS

International Search Report and The Written Opinion of the International Searching Authority mailed Sep. 24, 2007.

(Continued)

*Primary Examiner*—Igor Kershteyn
(74) *Attorney, Agent, or Firm*—Morgan Lewis & Bockius LLP

(57) ABSTRACT

A bulk materials pump feeder having a housing and a rotating drive rotor for transferring material from an inlet to an outlet of the housing. The drive rotor has a hub. Drive disks extend away from the hub toward a housing inner wall and have a compliant edge configured to deflect or compress when presented with pinched material rather than jamming.

17 Claims, 13 Drawing Sheets

U.S. PATENT DOCUMENTS

| | | |
|---|---|---|
| 5,402,876 A | 4/1995 | Hay |
| 5,427,283 A | 6/1995 | Whittaker et al. |
| 5,485,909 A | 1/1996 | Hay |
| 5,497,873 A | 3/1996 | Hay |
| 5,533,650 A | 7/1996 | Conrad et al. |
| 5,551,553 A | 9/1996 | Hay |
| 6,135,730 A | 10/2000 | Yoshioka |
| 6,213,289 B1 | 4/2001 | Hay et al. |
| 6,250,513 B1 | 6/2001 | Haas |
| 6,375,412 B1 | 4/2002 | Dial |
| 6,431,831 B1 | 8/2002 | Addie et al. |
| 6,523,726 B1 | 2/2003 | Tschantz |
| 6,575,695 B1 | 6/2003 | Miyamoto |
| 6,832,887 B2 | 12/2004 | Baer et al. |
| 7,044,288 B2 | 5/2006 | Baer et al. |
| 2003/0190198 A1* | 10/2003 | Baer et al. ............ 406/52 |
| 2004/0028485 A1* | 2/2004 | Baer et al. ............ 406/52 |

FOREIGN PATENT DOCUMENTS

| | | |
|---|---|---|
| EP | 0 544 621 | 6/1993 |
| WO | WO 96/24810 | 8/1996 |
| WO | WO 00/07912 | 2/2000 |
| WO | WO 03/087580 | 10/2003 |

OTHER PUBLICATIONS

Office Action from U.S. Appl. No. 11/947,486 dated Jun. 30, 2009.

\* cited by examiner

BULK MATERIAL PUMP FEEDER WITH REDUCED DISK JAMMING, COMPLIANT DISKS

RELATED APPLICATIONS

This application claims priority to U.S. Provisional Patent Application No. 60/726,340 filed Oct. 12, 2005 and which is hereby incorporated by reference in its entirety.

INCORPORATION BY REFERENCE

U.S. Pat. No. 7,044,288 issued May 16, 2006 and U.S. Pat. No. 6,832,887 issued Dec. 21, 2004 and all other references cited herein are hereby incorporated by reference as if set forth in their entirety herein.

TECHNICAL FIELD

The present invention relates, in general, to materials handling equipment and, in particular, to a pump feeder of materials handling equipment that feeds bulk materials.

BACKGROUND

In certain bulk materials handling equipment, such as the equipment described and illustrated in U.S. Pat. No. 5,051,041 and U.S. Pat. No. 5,355,993, a pump feeder moves bulk material through a housing from an inlet to an outlet by a rotating drive rotor having two or more drive disks mounted to or integral with a rotating hub. In the past, this type of equipment has been used for feeding coal and other breakable material having uniform and non-uniform gradation. Typically, the drive systems for this equipment have delivered large torque at slow speed.

As such equipment is adapted to handle different materials supplied in different sizes, problems that have not been encountered previously are arising. One such problem of major importance is the tendency of smaller size equipment, handling harder, smaller size material such as plastic, to stall, sometimes only temporarily, as the material being handled wedges between the rotating drive rotor and the housing or stationary parts mounted to the housing. This wedging of material can occur, for example, between the drive disks of the drive rotor and the housing inner wall or between the hub of the drive rotor and a materials scraper mounted to the inner wall of the housing.

Simply increasing the drive power (i.e., providing a larger drive motor) to overcome the wedging is not, in most instances, an adequate or satisfactory solution to the problem. Cost and space limitations are but two restrictions on simply providing increased drive power. Certain of the materials being handled are not easily breakable, so a larger drive motor merely increases the effect of the material wedging between the rotating drive rotor and the housing or stationary parts mounted to the housing. Thus, a larger drive motor can exacerbate the problem, resulting in a complete stoppage of operation and damage to the equipment. With breakable materials, such as coal, the drive torque is large enough to break or pulverize the material into smaller pieces that do not wedge between the rotating drive rotor and the housing or stationary parts mounted to the housing.

Although this adverse wedging effect might not be a regular occurrence and is likely to be different for handling different types of material, when it does occur, even temporarily, it affects accuracy and feeder performance to an unacceptable extent. Because the tendency of the equipment to stall, either temporarily or for longer periods of time, due to this wedging is greater at higher speed operation of the equipment, slowing down the operation of the equipment to reduce the likelihood of material wedging, while possibly reducing the likelihood of wedging, also is unacceptable.

To overcome the shortcomings of existing devices, a new bulk materials pump feeder is provided. An object of the present invention is to provide an improved bulk materials pump feeder that minimizes jamming of the disks. A related object is to prevent stall, even temporarily, caused as the material being handled wedges between the rotating drive rotor and the housing or stationary parts mounted to the housing. Another object is to avoid having to increase the drive power to overcome the wedging problem. It is still another object of the present invention to achieve these advantages within the confines of cost and space limitations. Yet another object of this invention is to provide a bulk materials pump feeder adapted to handle a wide variety of different materials supplied in different sizes. Additional objects are to achieve accuracy and assure optimal feeder performance.

SUMMARY OF THE PREFERRED EMBODIMENTS

In one embodiment there is a bulk materials pump feeder that includes a housing having an inlet, an outlet and an inner wall extending from the inlet to the outlet. The bulk materials pump feeder also includes a drive rotor having a hub rotatable about a rotation axis, a plurality of drive disks. At least one of the drive disks has a molded compliant portion. The bulk materials pump feeder also has a materials transfer duct defined by the inner wall, the drive rotor and at least two of the drive disks.

In a further embodiment of the bulk materials pump feeder, at least two of the drive disks have a compliant portion in close tolerance with the inner wall without creating a seal. In another embodiment of the bulk materials pump feeder, the drive rotor further includes at least one drive disk that does not include a compliant portion. In yet another embodiment of the bulk material pump feeder, at least two of the drive disks have different flexibility characteristics. In one embodiment of the bulk material pump feeder, at least one of the drive disks having a compliant portion includes a flexibility characteristic that varies from a central portion to an outer portion. In another embodiment of the bulk material pump feeder, the variation in flexibility characteristic corresponds to a variation in materials used to fabricate the disk. In a further embodiment of the bulk material pump feeder, a first plurality of the drive disks include outer disks that are non-compliant disks and the at least one compliant disk is an inner disk. In yet another embodiment of the bulk material pump feeder, at least one of the disks includes an inner core and an outer shell.

In one embodiment of the bulk material pump feeder, the outer shell includes a polymer. In another embodiment of the bulk material pump feeder, the polymer includes an elastomer. In a further embodiment of the bulk material pump feeder, the inner core extends radially to a tip of the disk. In one embodiment the inner core extends radially to an intermediate point of the disk. In one embodiment, the outer shell includes a polymer over-mold that extends to a tip of the disk. In another embodiment, the outer shell includes a flexible region that extends beyond a tip of the inner core. One embodiment of the bulk material pump feeder includes a flexible unsupported outer periphery having an unsupported distance and the inner core includes a radial extent and the ratio of unsupported distance to radial extent of the inner core is between approximately 0.1 to approximately 0.3. In another embodiment of the bulk material pump feeder, at least one of the disks includes an outer shell with a friction characteristic that facilitates movement of material through the material transfer duct.

In one embodiment, there is a bulk materials pump feeder that includes a housing having an inlet, an outlet and an inner wall extending from the inlet to the outlet; and a drive rotor having a hub rotatable about a rotation axis, a plurality of drive disks, at least one of the drive disks having a configuration that is different from a configuration of another one of the drive disks and a plurality of materials transfer ducts defined by the inner wall, the drive rotor and the plurality of drive disks drive disks. In a further embodiment of the bulk materials pump feeder, two of the plurality of drive disks are outer drive disks having a first configuration and wherein at least one additional drive disk is an inner drive disk having a second configuration that is different from the first configuration. In another embodiment of the bulk materials pump feeder, a difference between the first configuration and the second configuration is a sealing configuration relative to the inner wall.

In one embodiment there is a bulk materials pump feeder that includes a housing having an inner wall; a disk set having plurality of drive disks; and a plurality of transfer ducts defined by the inner wall and the disk set, at least one of the drive disks having a conformable outer periphery.

In another embodiment there is a bulk materials pump feeder comprising a disk set having plurality of drive disks with a conformable outer periphery.

It is to be understood that both the foregoing general description and the following detailed description are exemplary, but are not restrictive, of the invention. It is to be understood that both the foregoing general description and the following detailed description are exemplary, but are not restrictive, of the invention.

BRIEF DESCRIPTION OF THE FIGURES

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
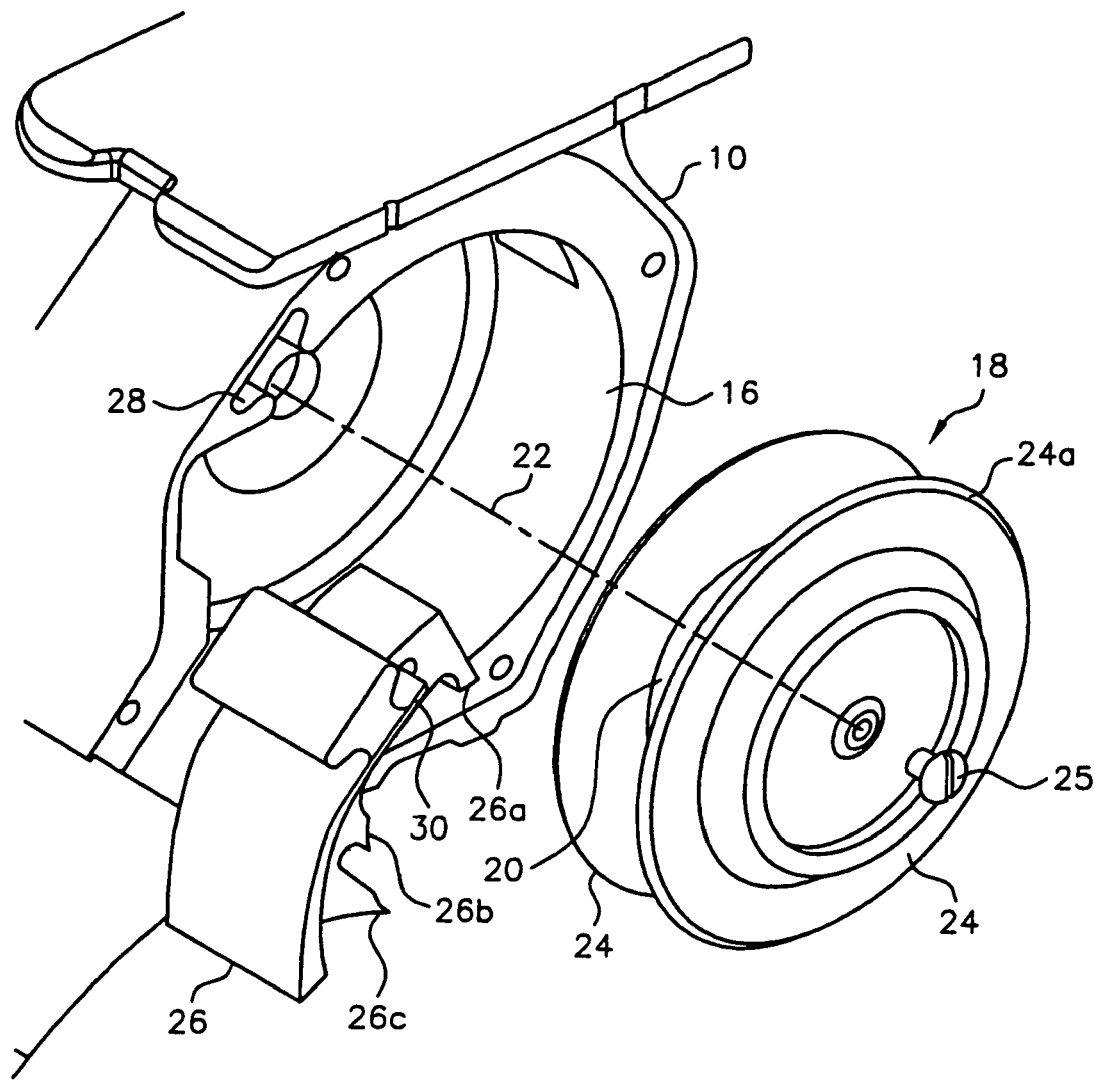
FIG. 1 is an exploded, perspective view of a bulk materials pump feeder constructed in accordance with a first embodiment of the present invention.
Figure 2:
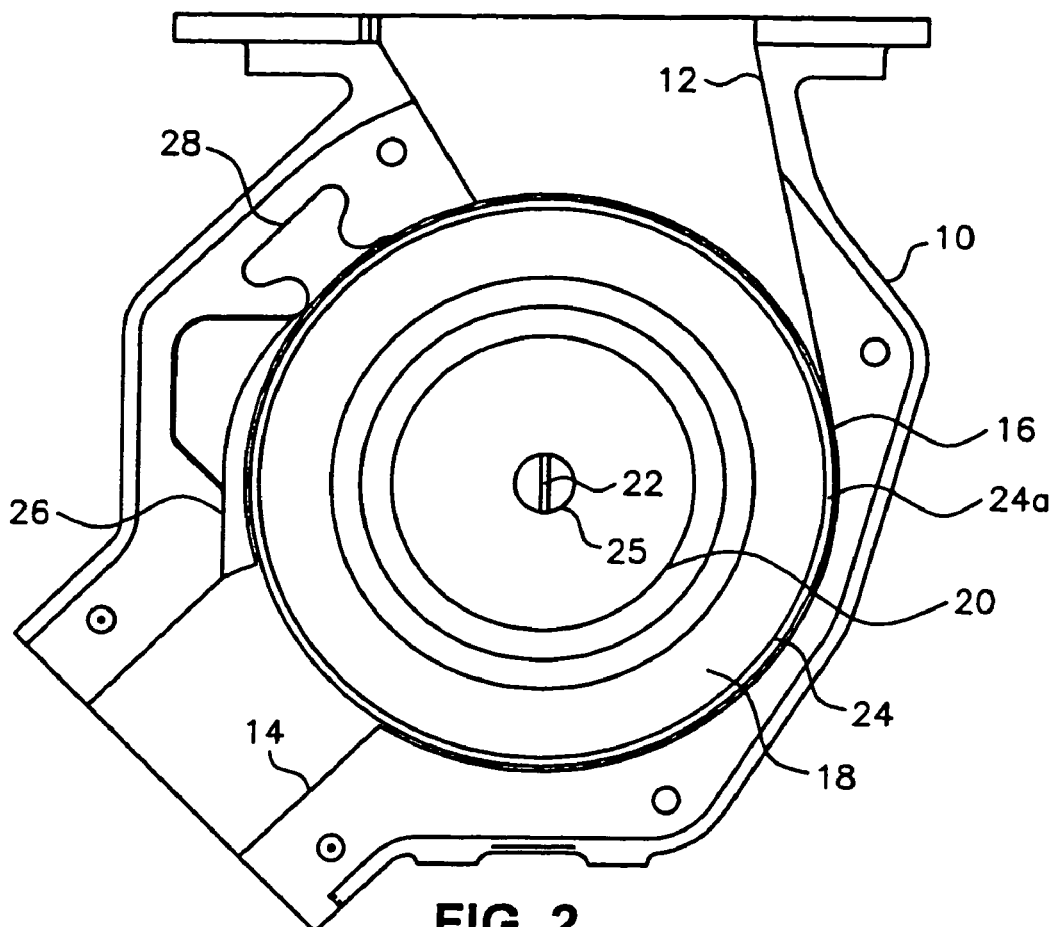
FIG. 2 is a side view of the bulk materials pump feeder shown in FIG. 1.

Referring to FIGS. 1 and 2, a bulk material pump feeder, constructed in accordance with the present invention, includes a housing 10 having an inlet 12, an outlet 14, and an inner wall 16 extending from inlet 12 to outlet 14. A bulk materials pump feeder, constructed in accordance with the present invention, is generally similar in construction and operation to the units described and illustrated in U.S. Pat. No. 5,051,041 and U.S. Pat. No. 5,355,993, the contents of which are incorporated in this document by reference.

The bulk materials pump feeder of FIGS. 1 and 2 also has a drive rotor 18 having a hub 20, which is rotatable about a rotation axis 22, and a pair of drive disks 24 which extend away from hub 20 toward inner wall 16 of housing 10. For the embodiment of the invention being described, hub 20 and drive disks 24 are formed as a single, integral, monolithic unit. Drive disks 24 can be formed with radially extending discontinuities on the interior faces as described and illustrated in U.S. Pat. No. 5,355,993 to facilitate transfer of material from inlet 12 to outlet 14 of housing 10. Preferably, the outside surfaces of drive disks 24 each have a bevel 24a at the circumferential edge of the drive disk for a reason to be explained below.

Drive rotor 18 is mounted in housing 10 for rotation about rotation axis 22 and is held in place by, for example, a screw 25. For the embodiment of the invention illustrated in the figures and being described, drive rotor 18 has two drive disks 24. Drive rotor 18 can be arranged, however, to have more than two drive disks 24. The number of drive disks 24 to be included in drive rotor 18 is dependent on the particular application of the bulk materials pump feeder (i.e., materials being transferred, performance specifications, etc.).

A. First Embodiment

Figure 3:
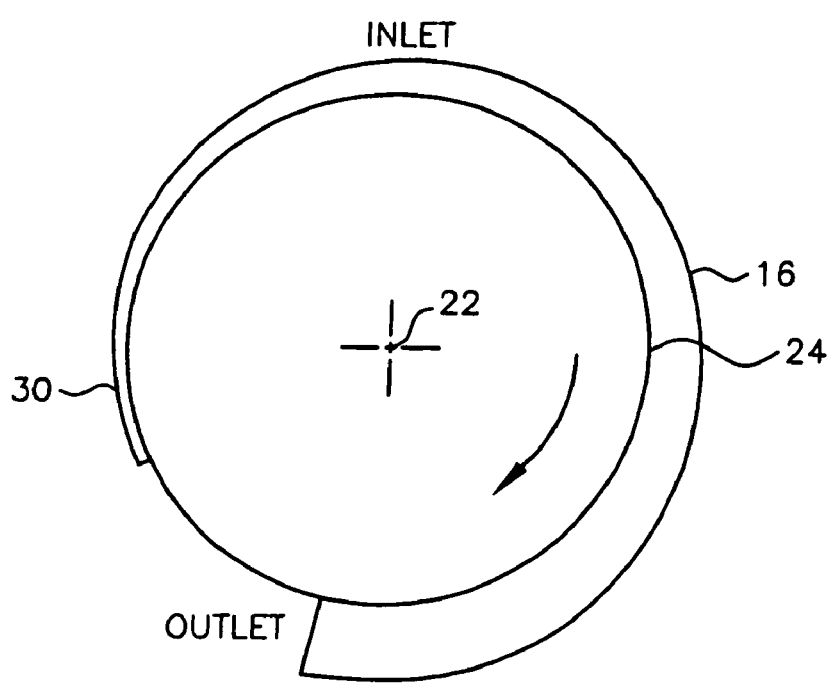
FIG. 3 is a schematic drawing of the relationship between the drive disks and the inner wall of the housing of the bulk materials pump feeder shown in FIGS. 1 and 2.

As shown most clearly in FIG. 3, which is a schematic drawing of the relationship between drive disks 24 and inner wall 16 of housing 10, the distance between the circumferential edges of drive disks 24 and inner wall 16 of housing 10 increases from INLET 12 of housing 10 to OUTLET 14 of housing 10 in the direction of rotation of drive rotor 18, which is clockwise as indicated by the arrow for the embodiment of the invention illustrated in the figures and being described. Drive disks 24 and inner wall 16 of housing 10 can be shaped in different ways to provide the desired spacing between the two components. For the embodiment of the invention illustrated in the figures and being described, drive disks 24 are circular and extend away from hub 20 perpendicular to rotation axis 22 of hub 20, and inner wall 16 of housing 10 is spiral shaped. The spiral-shaped inner wall 16 of housing 10 can be defined by the Archimedes spiral equation:

$$R = \theta * a$$

where: "R" is the radius; "θ" is the polar angle; and "a" is the rate of radial increase given in some unit of measure per angular unit, such as mm/degree. The distance between the circumferential edges of drive disks 24 and inner wall 16 of housing 10 is exaggerated in FIG. 3 for purposes of illustration.

For the embodiment of the present invention represented by FIG. 3, the desired increasing distance between the circumferential edges of drive disks 24 and inner wall 16 of housing 10 is affected by the spiral shape of inner wall 16 of housing 10. This desired increasing distance between the circumferential edges of drive disks 24 and inner wall 16 of housing 10 might also be achieved by the design and provision of alternative components or by a combination of the design of such alternative components and the design of inner wall 16 of housing 10.

Inner wall 16 of housing 10, the inside surfaces of drive disks 24, and hub 20 define a materials transfer duct through which material is transferred from inlet 12 of housing 10 to outlet 14 of housing 10. Drive rotor 18 is rotated by a motor (not shown) coupled to drive rotor 18 by a suitable mechanism. As drive rotor 18 is rotated, drive disks 24 cause material, introduced into the bulk materials pump feeder through inlet 12 of housing 10, to be transferred to outlet 14 of housing 10 where the material is discharged from the bulk materials pump feeder.

Pieces of material being transferred through the bulk materials pump feeder from inlet 12 to outlet 14 that tend to wedge between inner wall 16 of housing 10 and the circumferential edges of drive disks 24 move in the direction of rotation of drive rotor 18 to a larger spacing between the circumferential edges of drive disks 24 and inner wall 16 of housing 10 and do not wedge because of the increasing space between the circumferential edges of drive disks 24 and inner wall 16 of housing 10. Instead, this material is discharged through outlet 14. By beveling the outside surfaces of drive disks 24 at the circumferential edges, the surface areas of the circumferential edges of drive disks 24 are minimized, thereby reducing the tendency of material to wedge between drive disks 24 and inner wall 16 of housing 10.

Figure 4:
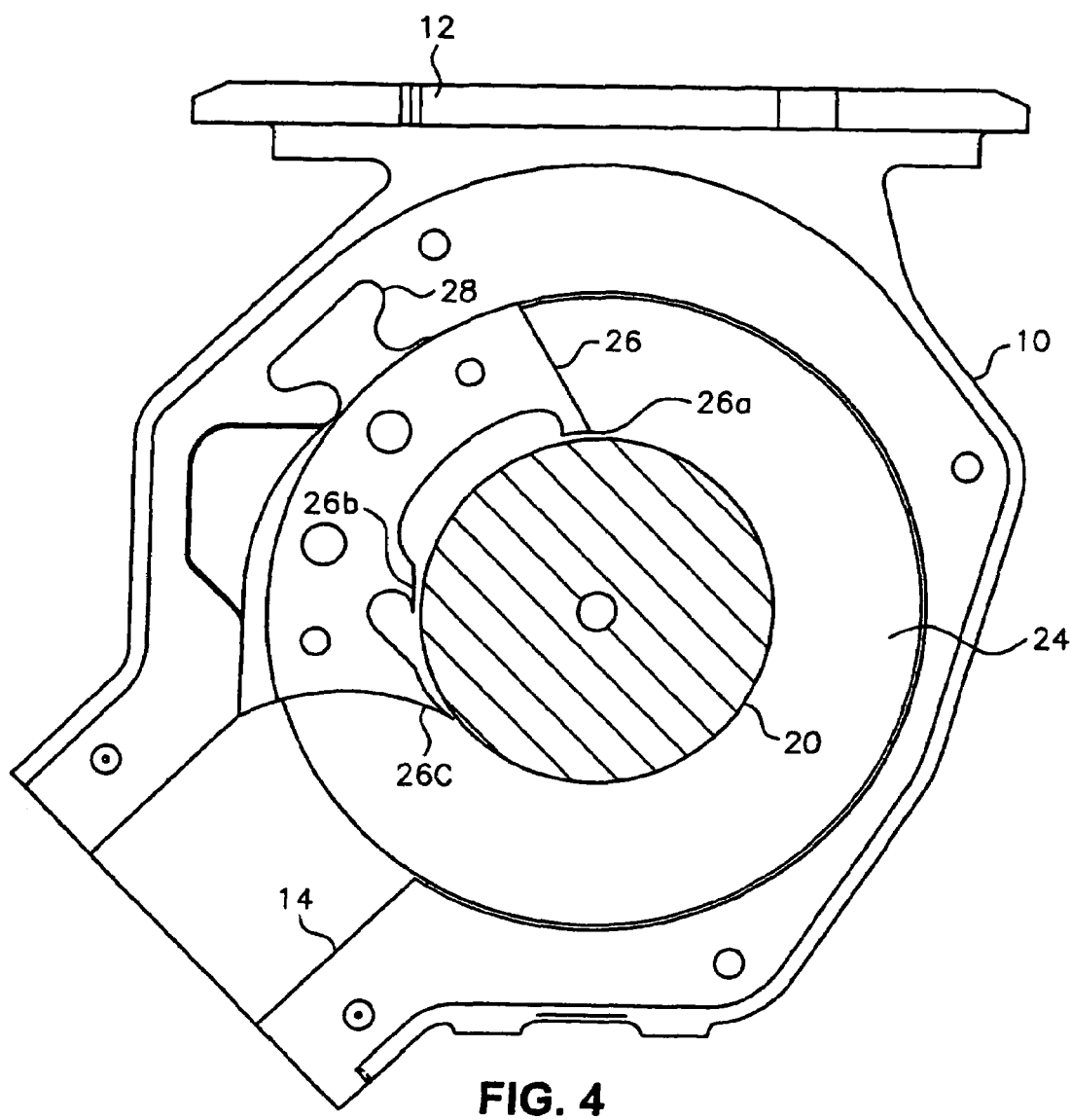
FIG. 4 is a side view showing the relationship of the drive rotor hub and the materials scraper illustrated in FIG. 1.

Referring to FIGS. 1, 2, and 4, a bulk materials pump feeder, constructed in accordance with the present invention, preferably includes a materials scraper 26 that is mounted in a recess 28 in inner wall 16 of housing 10 downstream from outlet 14 and upstream from inlet 12. Materials scraper 26 extends into drive rotor 18 in the space between the interior faces of drive disks 24 almost touching hub 20.

Certain materials that are transferred through the bulk materials pump feeder will cling, under certain conditions, to drive rotor 18. Such clinging material may not be discharged through outlet 14. Materials scraper 26 scrapes clinging material from drive rotor 18 and, generally, this material falls back and is discharged successfully through outlet 14.

Materials scraper 26 has two surfaces 30 (only one is illustrated in FIG. 1) that face the circumferential edges of drive disks 24. The distance between surfaces 30 of materials scraper 26 and the circumferential edges of drive disks 24 increases in the direction of rotation of drive rotor 18 from the distance between inner wall 16 of housing 10 and the circumferential edges of drive disks 24 at outlet 14 of housing 10 to the distance between inner wall 16 of housing 10 and the circumferential edges of drive disks 24 at inlet 12 of housing 10. In particular, surfaces 30 of materials scraper 26 are continuations, in effect, of inner wall 16 of housing 10, so that material that is not discharged at outlet 14 that tends to wedge between materials scraper 26 and the circumferential edges of drive disks 24 moves in the direction of rotation of drive rotor 18 to a larger spacing between drive disks 24 and materials scraper 26 and either falls back and is discharged through outlet 14 or falls into material that is introduced at inlet 12. The increasing space between surfaces 30 of materials scraper 26 and the circumferential edges of drive disks 24, from outlet 14 to inlet 12, is illustrated in FIG. 3.

Materials scraper 26 that is illustrated in FIGS. 1 and 4 has a plurality of scraping tips 26a, 26b, and 26c that scrape material that is not discharged at outlet 14. As illustrated in FIG. 4, the spacing between materials scraper 26 and hub 20, specifically the spacing between scraping tips 26a, 26b, and 26c and hub 20, increases in the direction of rotation of drive rotor 18 from outlet 14 to inlet 12 to reduce, or even eliminate, the tendency of material to wedge between materials scraper 26 and hub 20. Scraping tips 26a, 26b, and 26c can be points on a spiral or simply points that are spaced from hub 20 the desired distances.

Figure 5:
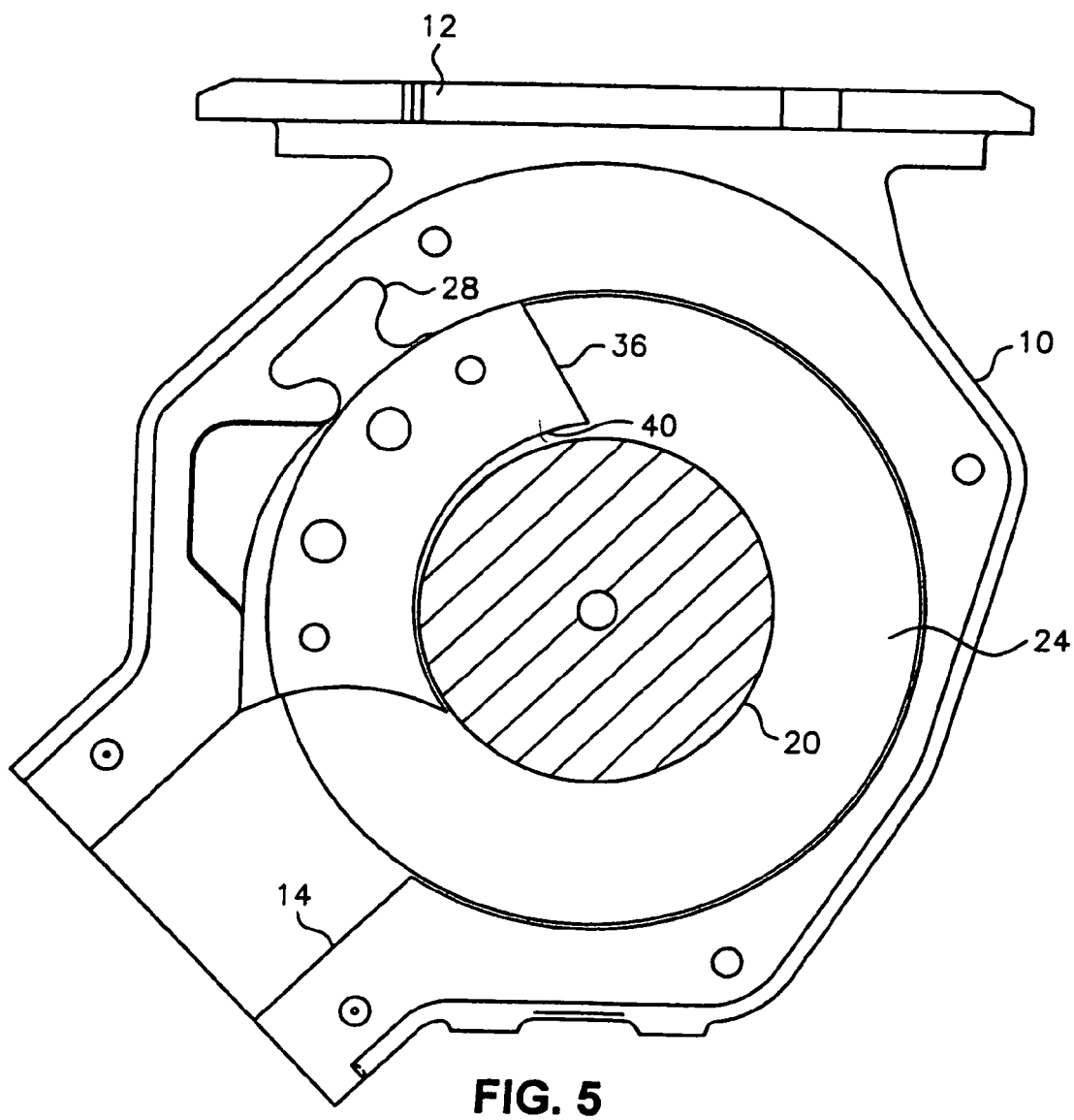
FIG. 5 is a side view showing the relationship of the drive rotor hub illustrated in FIG. 1 and a second materials scraper.

A second form of materials scraper 36 is illustrated in FIG. 5. Materials scraper 36 of FIG. 5 has a continuous scraping surface 40, rather than a plurality of scraping tips 26a, 26b, and 26c as in materials scraper 26 shown in FIG. 4. The spacing between scraping surface 40 of materials scraper 36 and hub 20 increases in the direction of rotation of drive rotor 18 from outlet 14 to inlet 12 to reduce, or even eliminate, the tendency of material to wedge between materials scraper 36 and hub 20. Scraping surface 40 of materials scraper 36 can be spiral shaped.

In the first embodiment of the present invention described above, the distance between the circumferential edges of drive disks 24 and inner wall 16 of housing 10 increases from INLET 12 of housing 10 to OUTLET 14 of housing 10 in the direction of rotation of drive rotor 18. The material being transferred through the bulk materials pump feeder does not wedge because of the increasing space between the circumferential edges of drive disks 24 and inner wall 16 of housing 10. Two other embodiments of the present invention also reduce the possibility of material jamming drive disks 24 when the bulk materials pump feeder is in operation.

B. Second Embodiment

Figure 6:
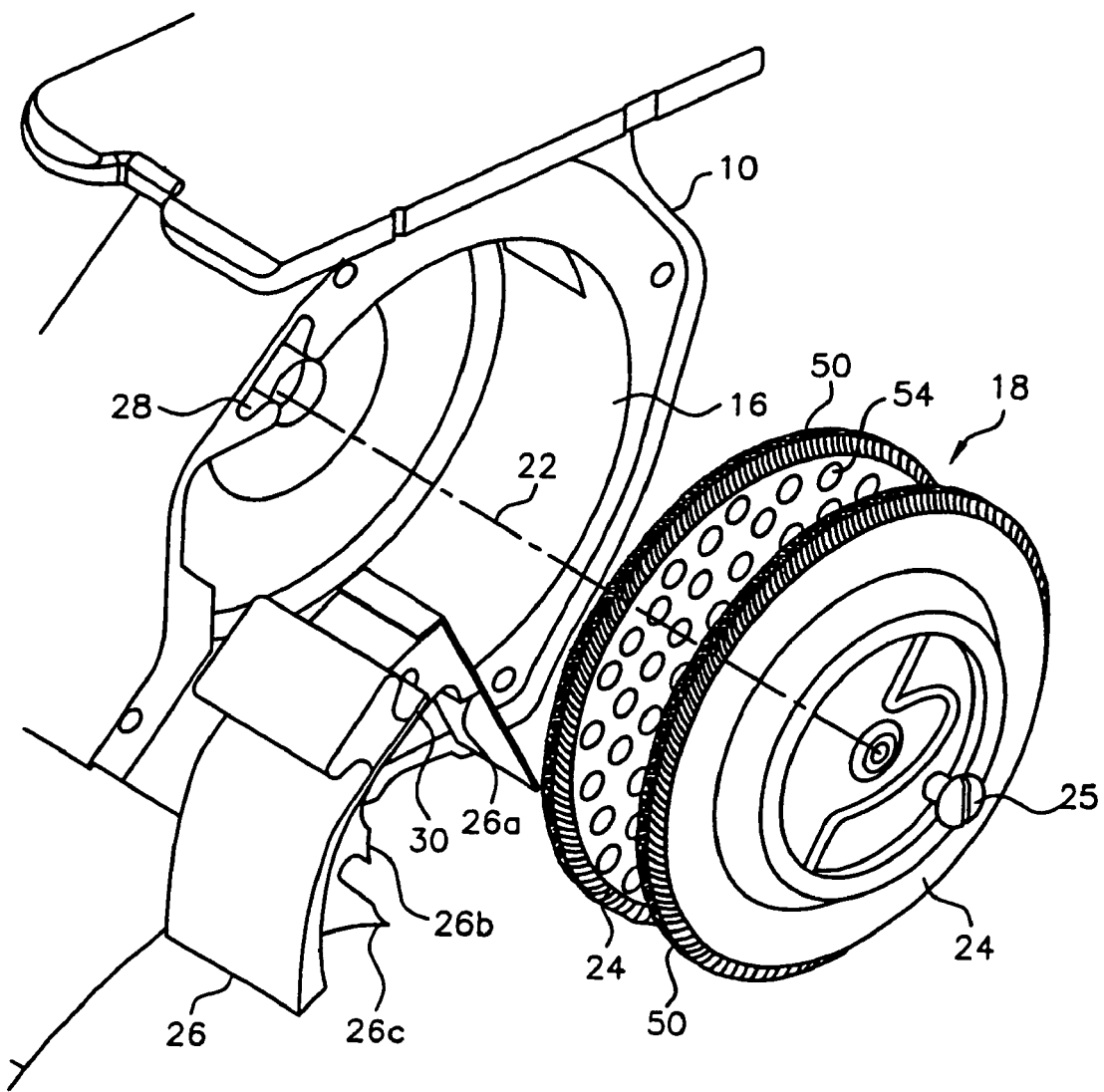
FIG. 6 is an exploded, perspective view of a bulk materials pump feeder constructed in accordance with a second embodiment of the present invention.
Figure 7:
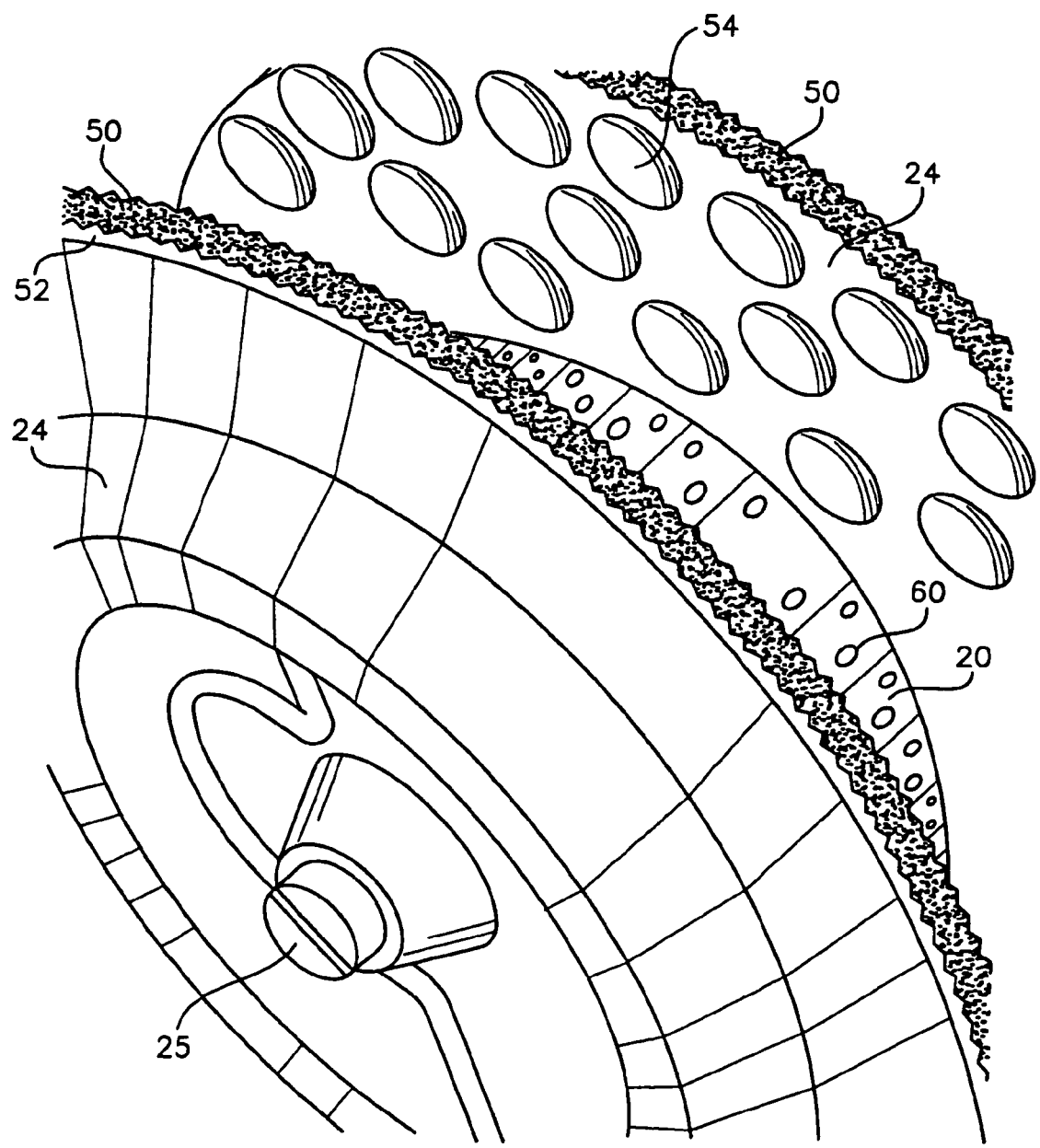
FIG. 7 is an exploded, perspective view of the drive disks of the bulk materials pump feeder shown in FIG. 6.

In the second embodiment of the present invention, as illustrated in FIGS. 6 and 7, a low-friction brush seal 50 is disposed on the periphery of drive disks 24. Brush seal 50 may be made of a number of different materials including, for example, pipe cleaner and rope. Brush seal 50 also may be constructed by combining a base made of metal, such as carbon steel, stainless steel, or aluminum, with a non-metallic brush made of a natural or synthetic fiber.

It is not necessary that brush seal 50 forms a perfect seal between the periphery of drive disks 24 and inner wall 16 of housing 10. Although a small amount of contact occurs between brush seal 50 and inner wall 16 of housing 10, brush seal 50 induces little or no friction between drive disks 24 and inner wall 16 of housing 10 as drive disks 24 rotate. A low-friction seal is important to avoid an extra load on the drive motor. Moreover, the addition of brush seal 50 does not introduce tolerance issues into the design of the bulk materials pump feeder.

Brush seal 50 may be attached to the periphery of drive disks 24 in a variety of ways. For example, brush seal 50 may be adhered to drive disks 24 using an adhesive such as glue. A presently preferred method for attaching brush seal 50 to drive disks 24 is to provide a groove or channel 52 in the edges of drive disks 24 that form the periphery of drive disks 24. Brush seal 50 is packed (i.e., wedged) into channel 52 in the edge of each drive disk 24. Of course, various methods may be combined to attach brush seal 50 to drive disks 24. Thus, for example, brush seal 50 may be both packed into and glued to channel 52.

Brush seal 50 prevents or at least minimizes the possibility of particles, which are sufficiently large to cause problems, from entering the region between the peripheral edges of drive disks 24 and housing 10. Particles that are sufficiently small to pass through brush seal 50 are unlikely to cause problems. Brush seal 50 achieves its function well for both pellet and powder materials. A specific benefit achieved by brush seal 50 for applications involving powder materials is that the material does not build up or grind between the peripheral edges of drive disks 24 and inner wall 16 of housing 10.

Brush seal 50 prevents or at least minimizes the possibility of particles wedging between the peripheral edges of drive disks 24 and inner wall 16 of housing 10.

Brush seal 50 also prevents or at least minimizes the possibility of particles passing through the gap formed between drive disks 24 and inner wall 16 of housing 10. Thus, brush seal 50 helps to retain particles in the materials transfer duct defined by inner wall 16 of housing 10, the inside surfaces of drive disks 24, and hub 20, preventing the particles from causing problems by interfering with components of the bulk materials pump feeder outside the materials transfer duct. Such retention also achieves the advantage of a cleaner bulk materials pump feeder, minimizing the need to clean and promoting the aesthetic appeal of the bulk materials pump feeder.

As mentioned above, drive disks 24 can be formed with radially extending discontinuities on the interior faces as described and illustrated in U.S. Pat. No. 5,355,993 to facilitate transfer of material from inlet 12 to outlet 14 of housing 10. As illustrated in FIGS. 6 and 7, the interior faces of drive disks 24 can have other features that give such faces texture. Dimples 54 are shown in FIGS. 6 and 7.

Textural features such as dimples 54 increase the friction between drive disks 24 and the material being handled by the bulk materials pump feeder. Such friction facilitates movement of the material through the materials transfer duct. Because optimal performance of the materials transfer duct depends upon a consistent, linear relationship between the material feed rate and the speed of the bulk materials pump feeder, slippage must be avoided. Some friction between drive disks 24 and the material being handled by the bulk materials pump feeder avoids slippage and helps to assure a linear speed of materials delivery.

As would be understood by a person of ordinary skill in the art, the two embodiments of the present invention described above may be independently incorporated in the bulk materials pump feeder according to the present invention. Alternatively, the two embodiments can be combined into a single bulk materials pump feeder. At least for certain applications, such combination may be expected to achieve a synergistic effect.

C. Third Embodiment

Figure 8:
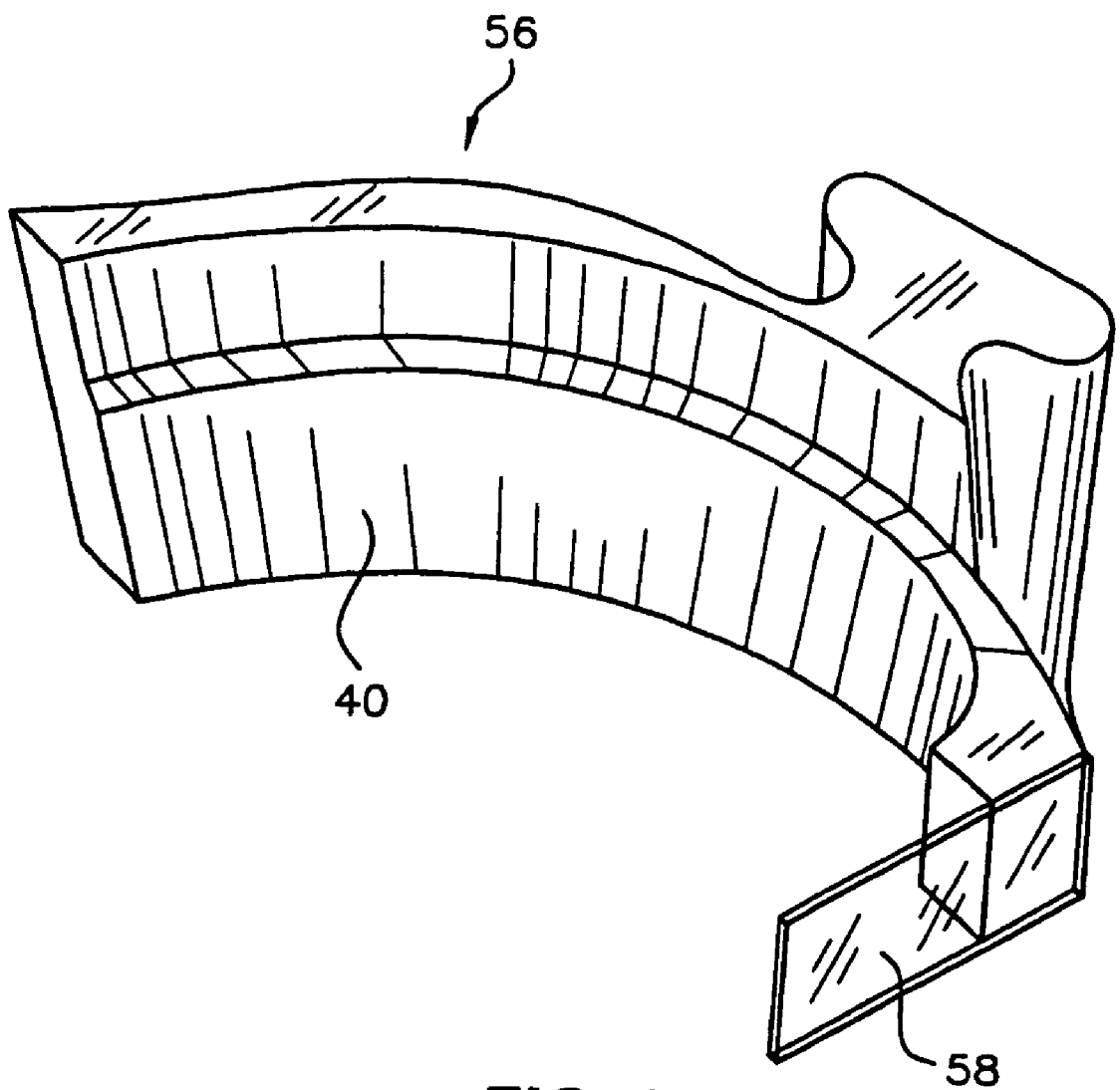
FIG. 8 is a perspective view of a third materials scraper of the bulk materials pump feeder constructed in accordance with a third embodiment of the present invention.
Figure 9:
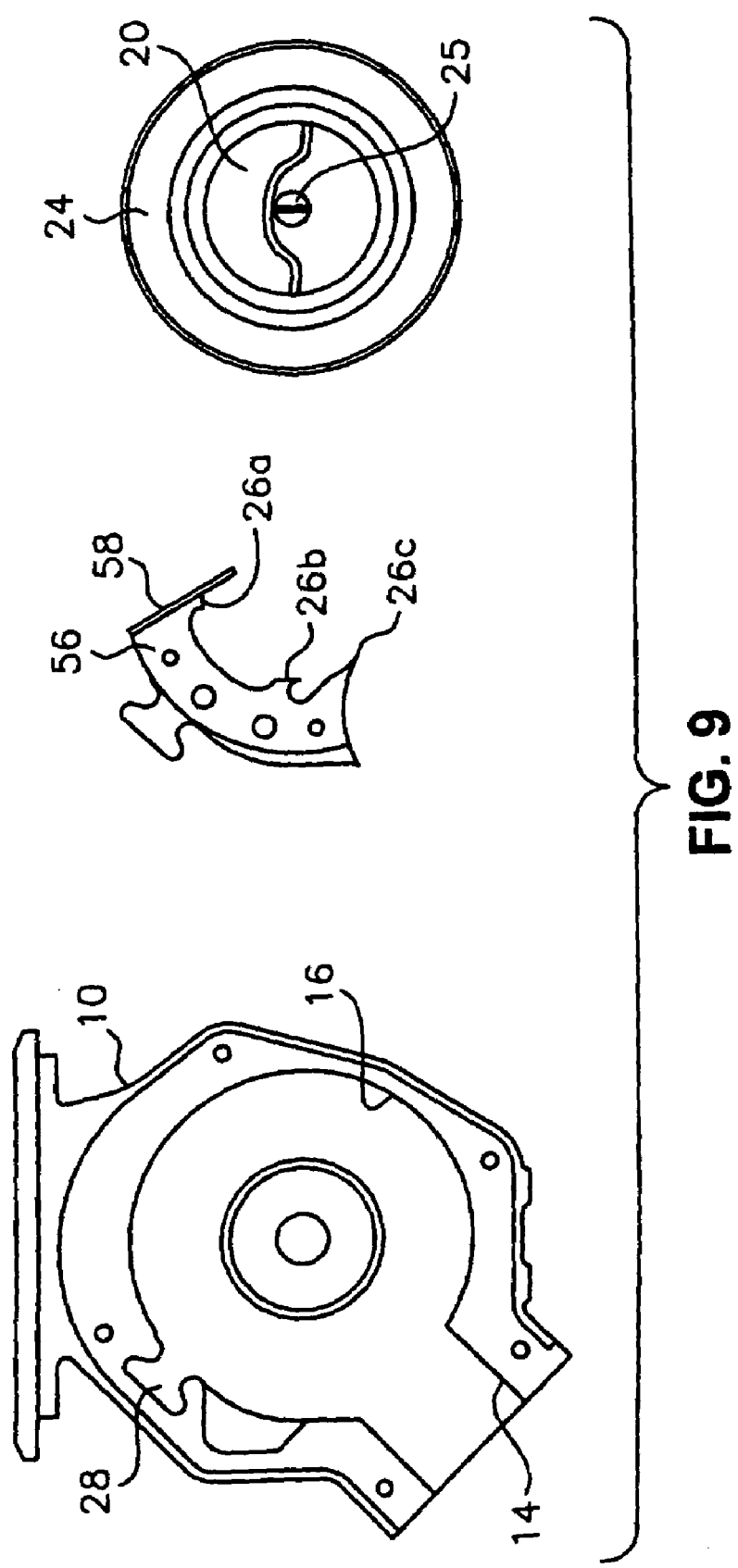
FIG. 9 is an exploded, perspective view of a bulk materials pump feeder constructed in accordance with the third embodiment of the present invention.

In the third embodiment of the present invention, as illustrated in FIGS. 8 and 9, a third form of materials scraper 56 is provided. As illustrated in FIG. 8, materials scraper 56 may have a continuous scraping surface 40 like materials scraper 36 of FIG. 5. Alternatively, as illustrated in FIG. 9, materials scraper 56 may have a plurality of scraping tips 26a, 26b, and 26c as does materials scraper 26 shown in FIG. 4.

The function of materials scraper 56 is to scrape the materials handled by the bulk materials pump feeder from drive disks 24 and hub 20 as the materials exit the bulk materials pump feeder. For many materials, such scraping is unnecessary. Materials scraper 56 is especially adapted for those applications which require no or only a minimal amount of scraping. Specifically, relative to materials scraper 26 of FIG. 4 and materials scraper 36 of FIG. 5, a majority of the structure forming materials scraper 56 has been eliminated (shown best in FIG. 8). In addition, materials scraper 56 has been provided with a flexible tip 58. Flexible tip 58 may be made of any suitable material; an elastomer or a clear plastic are acceptable. Preferably, flexible tip 58 is conductive so that electrostatic charge is dissipated. Electrostatic charge can build up or be derived from the passage of charged particles through a medium or conduit composed of essentially non-conductive materials.

Flexible tip 58 allows material to enter the bulk materials pump feeder through inlet 12 in its normal fashion, but prevents the material from flowing backward to the discharge point proximate outlet 14. Were flexible tip 58 omitted entirely from materials scraper 56, material could leak backward through the bulk materials pump feeder. In addition, when the bulk materials pump feeder is operating to feed material, some material tends to be carried by drive disks 24 and hub 20 past the discharge point-mainly due to the static charge of the material. The material clinging to the drive disks 24 and hub 20 tends to become caught or wedged between drive disks 24 and the materials scraper, jamming the bulk materials pump feeder. Flexible tip 58 solves this problem: materials that travel around past the discharge point either are deflected by flexible tip 58 and enter outlet 14 or pass by flexible tip 58 and reenter the materials stream directed toward the discharge. Materials scraper 56 having flexible tip 58 also prevents materials from jamming between the sides of drive disks 24 and the materials scraper.

Materials scraper 56 provides yet another advantage. Discussed above are the benefits provided by texturing the interior faces of drive disks 24 with such features as dimples 54 shown in FIGS. 6 and 7. It would be similarly advantageous to give hub 20 texture 60, shown in FIG. 7, in addition to texturing the interior faces of drive disks 24. Texture 60 on hub 20 has a drawback, however, because most materials tend to wedge between the textured areas (e.g., dimples) of hub 20 and materials scraper 26, 36. Thus, for most materials handled by the bulk materials pump feeder, it is not possible to texture hub 20 and the benefits of such texturing are lost. Because materials scraper 56 having flexible tip 58 minimizes the tendency of materials to wedge between texture 60 of hub 20 and materials scraper 56, however, incorporation of materials scraper 56 into the bulk materials pump feeder permits hub 20 to have texture 60. Thus, the advantages of texturing hub 20 are achieved.

Figure 10:
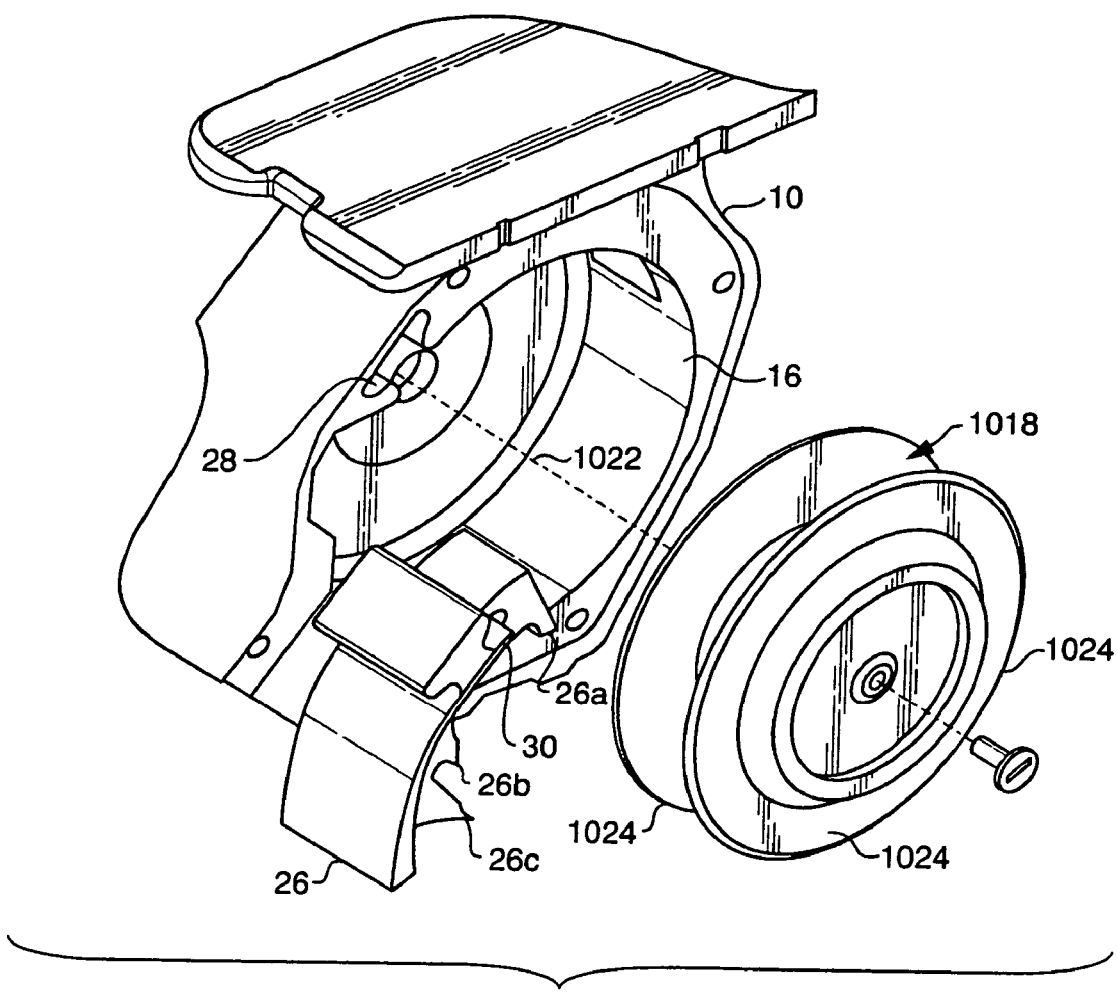
FIG. 10 is an exploded, perspective view of a bulk materials pump feeder constructed in accordance with the one embodiment of the present invention.

In another embodiment, illustrated in FIG. 10, there is a disk set 1018 having disks 1024 wherein at least a portion of disks 1024 are compliant (e.g., flexible and conformable with a surface). In one embodiment, compliant disks are useful in feeders having a construction that are relatively imprecise (e.g., feeds having a welded sheet metal construction). In one embodiment, use of a compliant disk solves a problem where a feeder would stall due to pinching of the bulk material between a disk and various points of the housing. In one embodiment of a bulk materials feeder a brush seal (e.g., as described above) may not be suitable for a particular application in which a feeder is imprecisely fabricated. In one embodiment, compliant disks 1024 do not substantially create a seal with inner wall 16 thereby permitting material to readily pass between the periphery of disks 1024 and inner wall 16. In one embodiment, this is distinguishable from disk 24 having a brush seal 50 that is configured to substantially prevent material from readily passing between the periphery of disks 24 and inner wall 16. In one embodiment, compliant disks 1024 have a close tolerance with inner wall 16 without creating a seal. In one embodiment, particles that may otherwise become lodged between disk 1024 and inner wall 16 are urged to outlet 14 due at least in part to the compliance of disks 1024. In one embodiment, disks 1024 have a flexibility that is configured to allow hard particles to deflect at least a portion of the disk or be dragged around harmlessly to the discharge without jamming the machine or both.

In the embodiment illustrated in FIG. 10, disk set 1018 includes two disks 1024. In other embodiments, disk set 1018 include more than two disks (e.g., three, four, five or six disks). In one embodiment, one or more disks 1024 in disk set 1018 have a configuration (e.g., one or more of the disk characteristics described herein including without limitation disk size, disk flexibility, the presence or absence of a peripheral seal, material(s) selection, the presence or absence of a perimeter bevel etc.) that is the same or different than one or more other disks 1024 in disk set 1018. For example, in one embodiment, each disk 1024 in disk set 1018 possess the same flexibility characteristics as the other disks in the disk set while in another embodiment, the flexibility characteristics of disks 1024 are different from disk to disk.

In one embodiment, one or more disks 1024 in disk set 1018 have a different property across the disks diameter. For example, in one embodiment, one or more disks 1024 have a flexibility that varies from the center of disk 1024 to the perimeter of the disk. In one embodiment, disk 1024 has a low flexibility region that extends radially from a center point of disk 1024 to a point between the center point of disk 1024 and the outer perimeter of disk 1024. In one embodiment, the variable properties of disk 1024 are achieved by varying the materials used to fabricate disk 1024.

Figure 11:
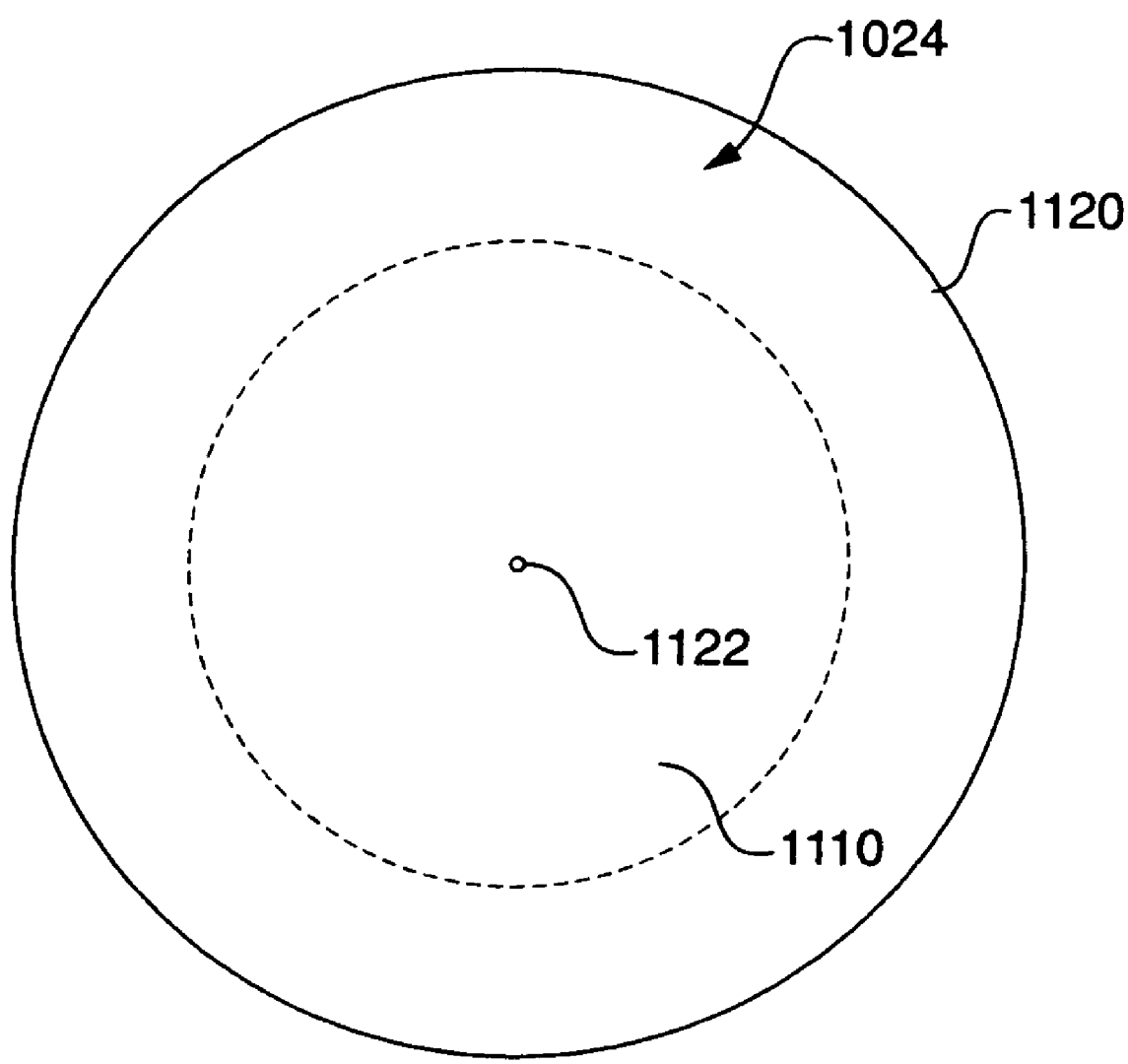
FIG. 11 is an illustration of a compliant disk of the present invention.

In one embodiment, illustrated in FIG. 11, disks 1024 are constructed of two or more materials. In the embodiment of FIG. 11, disks 1024 have a central portion 1110 of one material (e.g., metal or polymer) and a second outer portion 1120 of a different material (e.g., different metals, different polymers or metals with different properties or polymers with different properties or combinations of metals and polymers or other combinations of materials).

In one embodiment, the two or more materials have different compliant characteristics (e.g., flexibility, deformability). In one embodiment, central portion 1110 is less flexible than outer portion 1120. Thus, in one embodiment, central portion 1110 is especially suitable to secure disks 1024 to housing 10 and outer portion 1120 is especially suitable for keeping the machine free of clogs (e.g., as described above).

Figure 12:
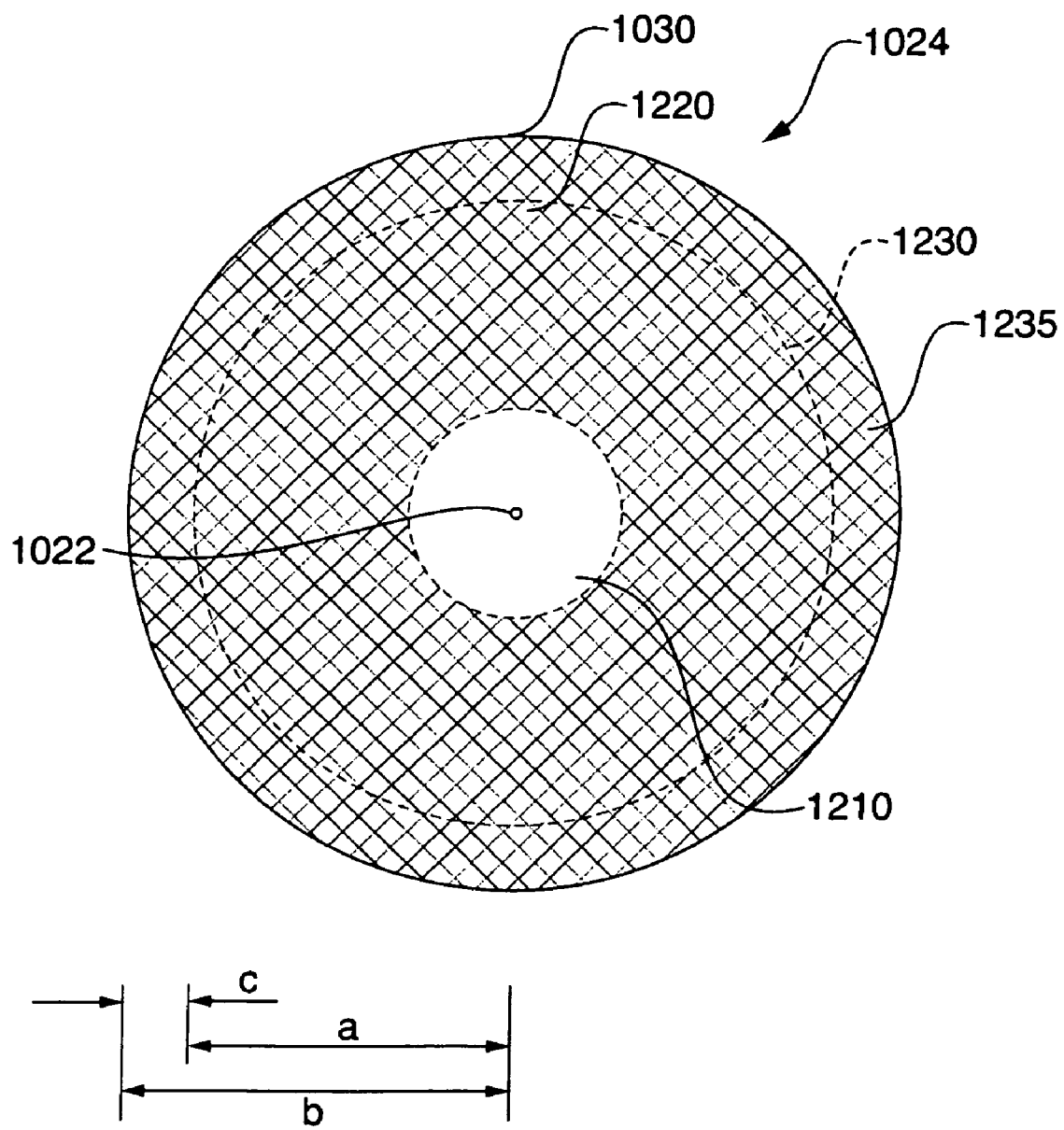
FIG. 12 is an illustration of a compliant disk of the present invention.

In one embodiment, illustrated in FIG. 12, disks 1024 has an inner core 1210 and an outer shell 1220 (illustrated with cross-hatching). In one embodiment, inner core 1210 is metal (e.g., carbon steel, stainless steel) and outer shell 1220 is polymer (e.g., silicone, Viton®, polyurethane, rubber or any elastomer). In one embodiment, disks 1024 have an inner core 1210 that extends radially to tip 1030. In another embodiment, inner core 1210 extends radially to intermediate point 1230. In one embodiment, outer shell 1220 is a polymer over mold that extends to tip 1030. In one embodiment an over molded outer shell 1220 eliminates the need to fabricate dimples in the disk because the outer shell 1220 achieves enough friction with the bulk material without the need for additional dimples. In one embodiment, outer shell 1220 extends radially beyond the radial limit of inner core 1210 to form flexible region 1235. In one embodiment, flexible region 1235 has a radial length of approximately ½ inch.

In one embodiment, outer shell 1220 is a coating (e.g., a polymer) applied to at least a portion of inner core 1210. In one embodiment, outer shell 1220 is an over-mold that covers at least a portion of inner core 1210. In one embodiment, outer shell 1220 extends beyond the radial perimeter of inner core 1210 (e.g., to form flexible region 1235).

In one embodiment, outer shell 1220 covers substantially all of inner core 1210. In one embodiment there is predetermined relationship between distance a (the distance between the radial extent of inner core 1210 and centerline 1022) and distance b (the distance between the radial extent of outer shell 1220 and centerline 1022). In one embodiment, distance a is substantially equal to distance b and therefore inner core 1210 extends radially to tip 1030. In one embodiment, illustrated in FIG. 12, distance b is greater than distance a, thus creating for example an unsupported distance c because inner core 1210 extends to intermediate point 1230. In one embodiment, the unsupported distance c is configured to form a compliant outer peripheral region of disk 1024. In one embodiment, a highly flexible region spans substantially the entire unsupported distance c. In another embodiment, a highly flexible region spans a portion of the unsupported distance c. In one embodiment, the ratio of distance c to distance b (i.e., ratio c/b) is between approximately 0.1 and approximately 0.3. In one embodiment, ratio c/b is approximately 0.2. In one embodiment, for example, distance a is approximately 2½ inches (inner core having a diameter of approximately 5 inches), distance b is approximately 3 inches (outer shell having a diameter of approximately 6 inches) and distance c is approximately ½ inch.

In one embodiment, disk 1024 possesses friction characteristics that facilitate the movement of material. In one embodiment, outer shell 1220 is a high friction coating that "grabs" material thus moving it through the feeder. In one embodiment, outer shell 1220 has a higher coefficient of friction than inner wall 16. In one embodiment, the outer surface of the outer shell 1220 contains discontinuities such that elements (e.g., particles, granules, particulates) of the bulk material being transferred engage the discontinuity to facilitate the transfer of the bulk material. In one example, disks 1024 have an inner core and an outer surface that possess different friction characteristics. In one embodiment, an outer core of elastomer is selected because of its friction characteristics, strength, flexibility, compatibility with a material being processed or combinations thereof.

Figure 13A:
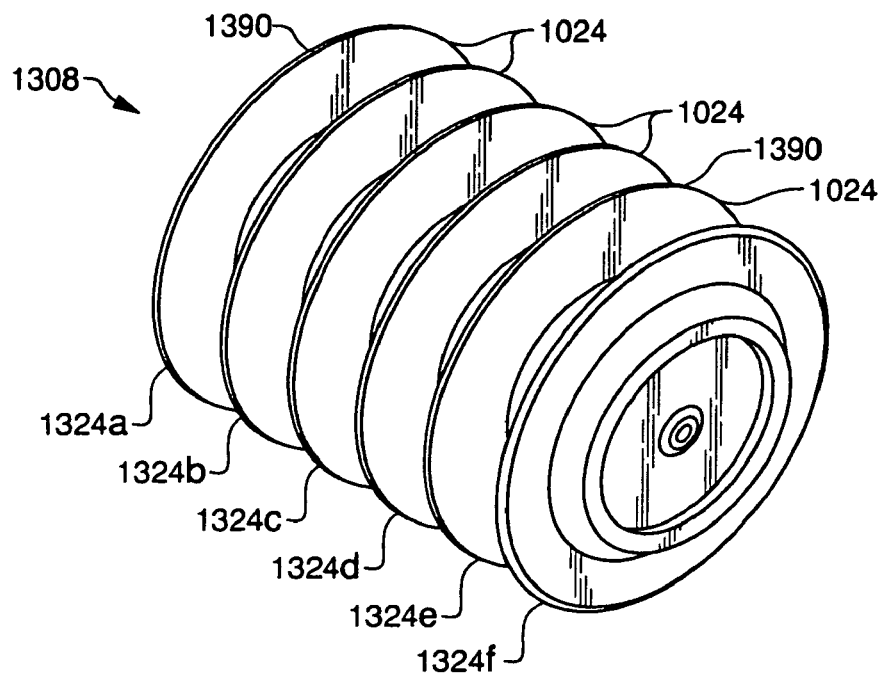
FIG. 13A is perspective illustration of a disk set of the present invention.

In one embodiment, illustrated in FIG. 13A, there is a disk set 1308 that contains six disks 1324*a*-1324*f* and five ducts 1390. In one embodiment, outer disks 1324*a*, 1324*f* have substantially the same configuration (e.g., any of the configuration described herein or described above in connection with FIG. 10) while inner disks 1324*b*-1324*e* have a configuration that is substantially the same as each other but different from the configuration of outer disks 1324*a*, 1324*f*. In one embodiment, the configuration that distinguishes outer disks 1324*a*, 1324*f* from inner disks 1324*b*-1324*e* is a compliance characteristic (e.g., flexibility or one of the other characteristics described herein). In another embodiment, the configuration difference between outer disks 1324*a*, 1324*f* from inner disks 1324*b*-1324*e* is a sealing configuration as between the disks 1324*a*-1324*f* and inner wall 16. In one embodiment, outer disks 1324*a* and 1324*f* substantially seal with inner wall 16 (e.g., using a brush seal or some other sealing mechanism such as those described herein) while inner disks 1324b-1324e have a clearance with respect to inner wall 16 that does not substantially seal inner disks 1324b-1324e to inner wall 16. (e.g., a clearance of approximately 1 mm or greater including, without limitation, up to 5 mm of clearance). In one embodiment inner disks 1324b-1324e are compliant disks while outer disks 1324a, 1324f are substantially not compliant disks. In one embodiment, one or more of disks 1324a-1324f possess friction characteristics (e.g., as described herein) that facilitate the movement of bulk material.

In one embodiment, there is a bulk material feeder having combinations of full diameter disks (e.g., extending substantially to inner wall 16 or to within a close tolerance of inner wall 16) and reduced diameter disks (e.g., disks that have a large tolerance gap between the disk and inner wall 16 (e.g., ¼ inch to ½ in gap). In one embodiment, full diameter disks include perimeter seals (e.g., brush seals such as those described herein). In one embodiment, full diameter disks include compliant disks (e.g., an elastomer tipped disk). In one embodiment, full size disks are installed as the outer disks in a disk set while reduced diameter disks are installed as the inner disks in a disk set. Because the reduced diameter disks are sized with consideration given to the particle size contained in the bulk material to be moved, reduced diameter disks will reduce or eliminate the opportunity for particles to jam.

Figure 13B:
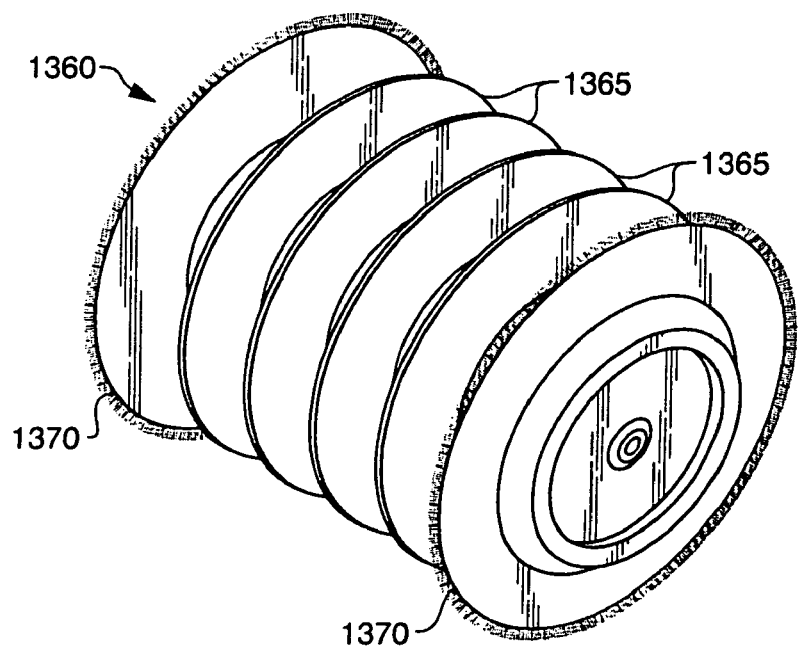
FIG. 13B is a perspective illustration of a disk set having full diameter outer disks with brush seals and reduced diameter inner disks without brush seals of the present invention.

In FIG. 13B there is illustrated a disk set 1360 having one or more (e.g., 2, 3 or 4) center disks 1365 having a reduced diameter (e.g., wherein the distance between the disk tip and the housing is between approximately ¼ inches and ½ inches). In one embodiment, the reduced diameter disk is a metal disk (e.g., stainless steel disk) or a polymer disk (e.g., of any polymer described herein) or a polymer coated disk (e.g., coated with any polymer described herein). Disk set 1360 further includes two outer disks 1370 that are full diameter disk. The full diameter disks illustrated in FIG. 13B also include brush seals 1371.

In one embodiment, there is a disk set that includes two or more disks that have one or more of: a full diameter with a beveled edge, a full diameter without a beveled edge, a full diameter with a seal (e.g., a brush seal), a full diameter without a seal, a full diameter with an elastomer edge, a reduced diameter disk with an elastomer edge, a reduced diameter with a beveled edge and a reduced diameter disk without a beveled edge.

Figure 14:
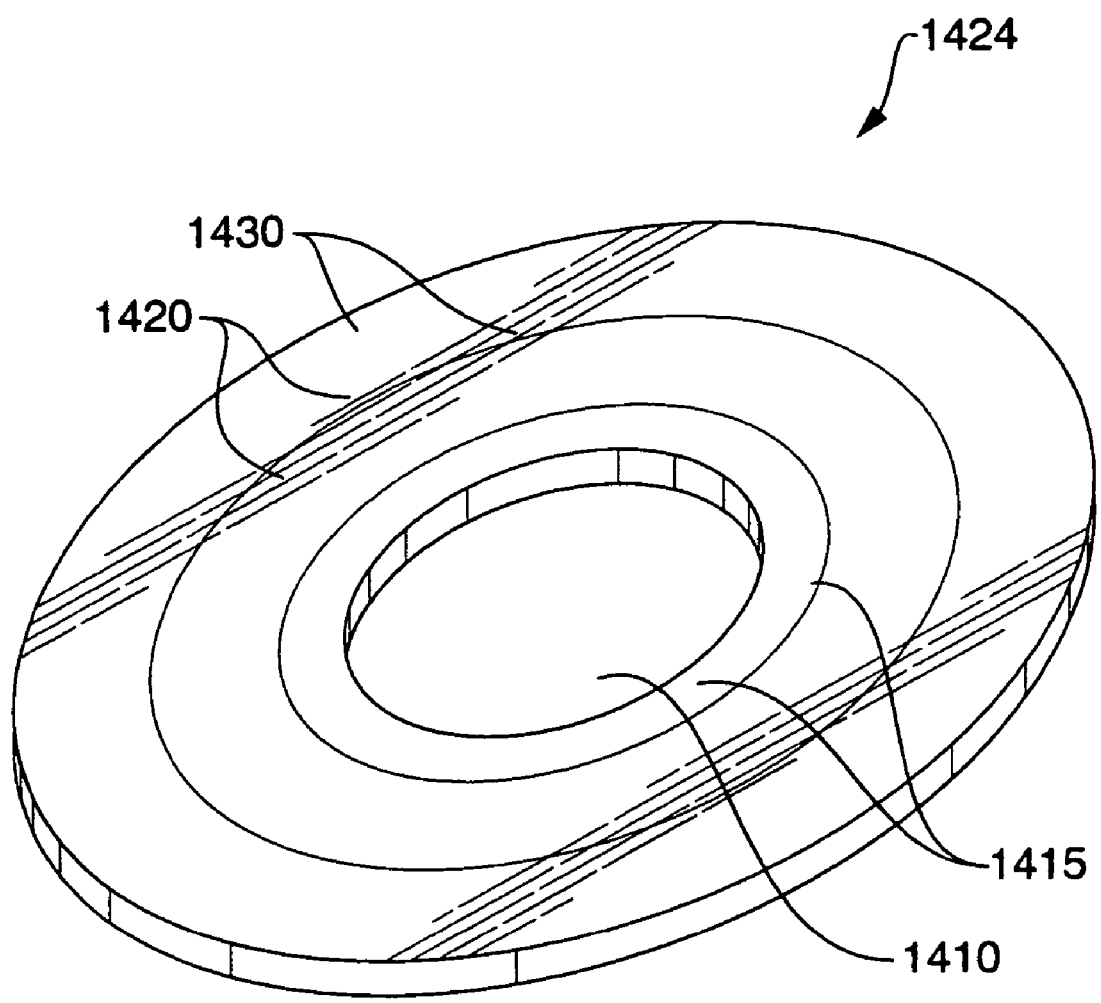
FIG. 14 is an illustration of a compliant disk of the present invention.

In one embodiment, illustrated in FIG. 14, there is a disk 1424 that is configured to accommodate a hub (not shown in FIG. 14) within a central aperture 1410. In FIG. 14, disk 1424 includes inner core and outer over-mold 1420 and highly flexible region 1430 (e.g., an unsupported region). In one embodiment, aperture 1410 can be of any diameter selected to accommodate a desired hub.

As would be understood by a person of ordinary skill in the art, the embodiments of the present invention described above may be independently incorporated in the bulk materials pump feeder according to the present invention. Alternatively, any two or even all of the embodiments can be combined into a single bulk materials pump feeder. At least for certain applications, such combination may be expected to achieve a synergistic effect. Although illustrated and described above with reference to certain specific embodiments, the present invention nevertheless is not intended to be limited to the details shown. Rather, various modifications may be made in the details within the scope and range of equivalents of the claims and without departing from the spirit of the invention.

The invention claimed is:

1. A bulk materials pump feeder comprising:
    a housing having an inlet, an outlet and an inner wall extending from the inlet to the outlet;
    a drive rotor having a hub rotatable about a rotation axis, a plurality of drive disks, at least one of the drive disks having an inner core and a compliant portion, the compliant portion at least partially overlapping the inner core and extending beyond an outer periphery of the inner core; and
    a materials transfer duct defined by the inner wall, the drive rotor and at least two of the drive disks.

2. The bulk materials pump feeder of claim 1 wherein the compliant portion is in close tolerance with the inner wall without creating a seal.

3. The bulk materials pump feeder of claim 1 wherein the drive rotor further includes at least one drive disk that does not include a compliant portion.

4. The bulk material pump feeder of claim 1 wherein at least two of the drive disks have different flexibility characteristics.

5. The bulk material pump feeder of claim 1 wherein at least one of the drive disks having the compliant portion includes a flexibility characteristic that varies from a central portion to an outer portion.

6. The bulk material pump feeder of claim 5 wherein the variation in flexibility characteristic corresponds to a variation in materials used to fabricate the at least one drive disk.

7. The bulk material pump feeder of claim 1 wherein a first plurality of the drive disks include outer disks that are non-compliant disks and the at least one drive disk having the compliant portion is an inner disk.

8. The bulk material pump feeder of claim 1, wherein the compliant portion is configured as an outer shell.

9. The bulk material pump feeder of claim 1 wherein the compliant portion includes a polymer.

10. The bulk material pump feeder of claim 9 wherein the polymer includes an elastomer.

11. The bulk material pump feeder of claim 1 wherein the inner core extends radially to an intermediate point of the compliant portion.

12. The bulk material pump feeder of claim 1 wherein the compliant portion includes a polymer over-mold that extends to a tip of the at least one drive disk.

13. The bulk material pump feeder of claim 1 wherein the compliant extends beyond the outer periphery of the inner core an unsupported distance and overlaps the inner core a supported distance, the ratio of unsupported distance to the supported distance being between approximately 0.1 to approximately 0.3.

14. The bulk material pump feeder of claim 1, wherein the compliant portion overlaps substantially all of the inner core.

15. The bulk material pump feeder of claim 1, wherein the compliant portion has a higher coefficient of friction than the inner wall.

16. The bulk material pump feeder of claim 1, wherein the plurality of drive disks extend from the hub perpendicular to the rotation axis.

17. The bulk material pump feeder of claim 1, wherein the inner core is less flexible than the compliant portion.

* * * * *